(12) United States Patent
Yoshimura et al.

(10) Patent No.: US 7,159,434 B2
(45) Date of Patent: Jan. 9, 2007

(54) METHOD OF MANUFACTURING TORSION BAR FOR VEHICLE STEERING DEVICE AND TORSION BAR

(75) Inventors: Motonobu Yoshimura, Osaka (JP); Masafumi Okumoto, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/501,654

(22) PCT Filed: Mar. 13, 2003

(86) PCT No.: PCT/JP03/02978

§ 371 (c)(1),
(2), (4) Date: Jul. 15, 2004

(87) PCT Pub. No.: WO03/076097

PCT Pub. Date: Sep. 18, 2003

(65) Prior Publication Data

US 2005/0115051 A1    Jun. 2, 2005

(30) Foreign Application Priority Data

Mar. 14, 2002    (JP)    ............................ 2002-070250

(51) Int. Cl.
*B01D 53/88*    (2006.01)

(52) U.S. Cl. ........................ 72/275; 72/340; 29/897.2; 267/273; 74/388 PS

(58) Field of Classification Search ................ 72/275, 72/340; 29/897.2; 267/273; 74/388 PS
See application file for complete search history.

(56) References Cited

U.S. PATENT DOCUMENTS

| | | | | |
|---|---|---|---|---|
| 2,741,833 A | * | 4/1956 | Beringer | ........................ 72/340 |
| 2,767,837 A | * | 10/1956 | Nachtman et al. | ............. 72/42 |
| 2,880,855 A | * | 4/1959 | Nachtman | ........................ 72/42 |
| 4,550,597 A | | 11/1985 | Drutchas et al. | |
| 4,699,174 A | | 10/1987 | Bishop | |
| 5,127,253 A | * | 7/1992 | Takahara et al. | ............... 72/356 |
| 5,453,139 A | * | 9/1995 | Gallagher, Jr. | ............... 148/651 |
| 5,979,209 A | * | 11/1999 | Belliato et al. | ................ 72/340 |

FOREIGN PATENT DOCUMENTS

| | | | |
|---|---|---|---|
| GB | 2240059 | * | 7/1991 |
| JP | 3-189043 | | 8/1991 |
| JP | 6-142812 | | 5/1994 |
| JP | 11-347683 | | 12/1999 |

* cited by examiner

*Primary Examiner*—Daniel C. Crane
(74) *Attorney, Agent, or Firm*—Jordan and Hamburg LLP

(57) ABSTRACT

A method of manufacturing a torsion bar includes a first shaping step of reducing a diameter of a round bar steel material according to cold drawing work so as to have a hardness including an inside through a surface layer of 320 or more to 450 or less by Vickers hardness (HV), and a second shaping step of cutting a midway area of the steel material in the longitudinal direction so as to obtain a spring portion.

15 Claims, 4 Drawing Sheets

METHOD OF MANUFACTURING TORSION BAR FOR VEHICLE STEERING DEVICE AND TORSION BAR

This application is a 371 of PCT/JP03/02978, filed Mar. 13, 2003.

TECHNICAL FIELD

The present invention relates to a method of manufacturing a torsion bar for a steering apparatus of a vehicle such as an automobile and the torsion bar.

BACKGROUND ART

As disclosed in specifications of U.S. Pat. Nos. 4,699,174 and 4,550,597, steering apparatuses such as power steerings provided to vehicles such as automobiles assist rotating operation power using a power source such as a motor or a hydraulic mechanism at the time of the rotating operation of a steering wheel. A torsion bar of the present invention is unitized in order to control the operation of the power source.

The torsion bar is used on a path for transmitting a rotating power of the steering wheel to a steering gear box. When the steering wheel is rotated, the torsion bar is twisted, so that a difference is generated between a rotation phase on the side of the steering wheel and a rotation phase on the side of the steering gear box. The phase difference is suitably detected so that the operation of the power source is controlled.

In the torsion bar for the steering apparatus, both ends in a longitudinal direction are joint portions which are supported by an object to be attached, and a midway portion in the longitudinal direction is a spring portion which allows torsion. Such a kind of torsion bars include a torsion bar in which its entire shape is a round bar, for example, joint portions on both ends in its longitudinal direction have large diameter, and a spring portion on a midway portion in the longitudinal direction has a small diameter.

The torsion bar used for the above application requires predetermined fatigue strength against repeated torsion. The fatigue strength against repeated torsion is determined so as to satisfy a condition such that when a torsion stress of 300 MPa or more is applied, torsion can be carried out at least 500,000 times.

A method of manufacturing the prior torsion bar is explained. A round bar steel material with low hardness first undergoes a cutting work so as to have an outer shape which is close to a finished product. The steel material having the outer shape close to the finished product by the cutting undergoes high-temperature heat treatment so as to have predetermined high hardness. Finally, warping of a matrix due to the heat treatment is corrected and distortion is removed, so that an outer diameter is adjusted. In such a manner, the prior torsion bar is first shaped into the outer shape close to the finished product of the torsion bar, and then its hardness is adjusted so as to be high.

A main object of the present invention is to provide a method of manufacturing a torsion bar for first giving treatment which heighten a hardness of an entire round bar steel material according to cold drawing work, and working the round bar steel material into an outer shape close to a finished product of a torsion bar, so as not to require high-temperature heat treatment for heightening the hardness.

DISCLOSURE OF THE INVENTION

The present invention is a method of manufacturing a torsion bar having a spring portion in a midway area in a longitudinal direction and joint portions on both ends in the longitudinal direction, including: a first shaping step of reducing a diameter of a steel material by reduction of area within a predetermined range according to cold drawing work so as to heighten a hardness of the entire steel material within a predetermined range; and a second shaping step of cutting the midway area of the steel material in the longitudinal direction so as to obtain the spring portion. The cold drawing is for plastically working a workpiece at a low temperature not higher than an annealing temperature, and reducing a diameter of a steel material via a die having a gradually smaller diameter. Cutting is one of removing work for removing an unnecessary portion of a workpiece as using a machine tool and a tool so as to work the workpiece into desired shape and dimension. The cutting includes turning and grinding.

As one preferable mode of the present invention, the hardness of the entire steel material after the cold drawing work is 320 or more to 450 or less by Vickers hardness (HV).

As one more preferable mode of the present invention, the reduction of area is 12 to 15%.

In the present invention, high-temperature heat curing treatment is not carried out unlike prior examples, but plastic deformation for reducing a diameter of a steel material using the cold drawing work is executed so that the entire hardness is adjusted to be large. That is to say, since only a dimension for the plastic deformation of the steel material is determined and the heat treatment, which costs the most in the prior examples, is not carried out. The present invention is, therefore, advantageous to a reduction in manufacturing cost.

As disclosed in Japanese Patent Application Laid-Open No. 3-189043 (1991), a torsion bar here is obtained in such a manner that a steel material whose diameter is larger than a finished diameter of joint portions of the torsion bar is used, and only a spring portion of the torsion bar is swaged. It is, however, difficult to control a length of the spring portion accurately according to the swaging. Further, since after-treatment for the swaging is not carried out, accuracy of circularity and outer diameter of the spring portion is low.

As one more preferable mode of the present invention, the blueing step may be given to the steel material before or after the second shaping step. In this case, the hardness of the steel material can be heightened comparatively simply. Further, as the steel material, one of SUP12 and SWRH82B of JIS can be selected.

BEST MODE FOR CARRYING OUT THE INVENTION

With reference to FIGS. 1 to 5, a method of manufacturing a torsion bar according to the best mode of the present invention is explained. A torsion bar 1 has a round bar shape from an overall view. The torsion bar 1 has such a shape that a midway area in a longitudinal direction has a spring portion 2 with small diameter, and both end areas in the longitudinal direction have joint portions 3 and 4 with a large diameter. The spring portion 2 has a circular section and has a uniform diameter in the longitudinal direction. A diameter of the joint portions 3 and 4 is larger than the diameter of the spring portion 2, and they have a circular section and a uniform diameter in the longitudinal direction. The size of the diameter of the spring portion 2, the joint portions 3 and 4 is not limited to this mode. A length relationship between the spring portion 2 and the joint portions 3 and 4 may be suitably determined according to automobiles which use the torsion bar. The section of the joint portions 3 and 4 is not necessarily circular.

Portions connecting the spring portion 2 and the joint portions 3 and 4 have a round curved surface so that the diameter is gradually widened to a direction from the spring portion 2 to the joint portions 3 and 4. When a steering wheel is rotated in a steering apparatus such as a power steering, the spring portion 2 is twisted so as to generate a difference between a rotation phase on the side of the steering wheel and a rotation phase on the side of a steering gear box. The spring portion 2 allows the torsion. The joint portions 3 and 4 are jointed to an object to be attached in the steering apparatus. For attaching to such an object to be attached, the joint portions 3 and 4 are provided with a spline, a serration, a through hole piercing in a radial direction, or the like (not shown), if necessary.

Figure 1:
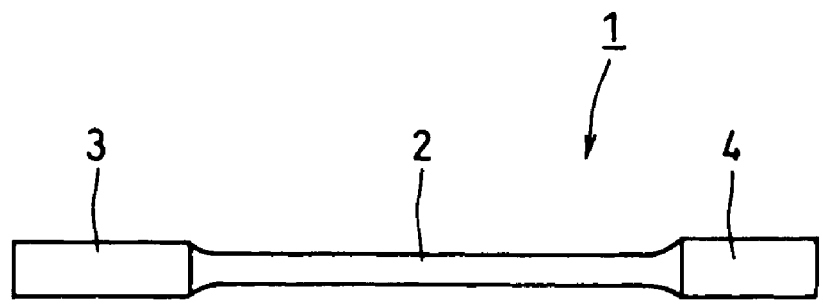
FIG. 1 is a side view illustrating a torsion bar according to a best mode of the present invention.
Figure 2:
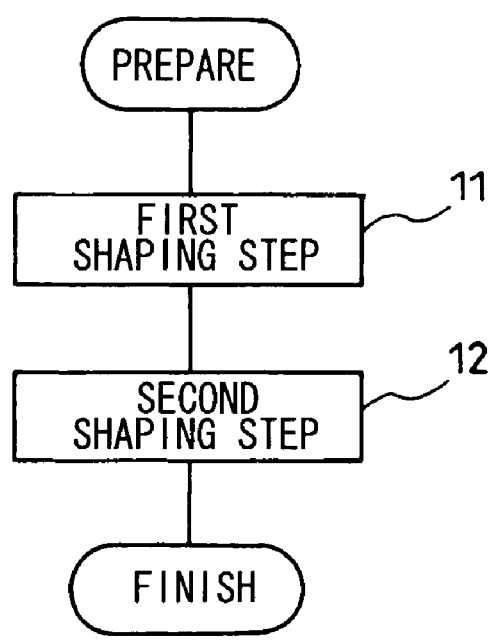
FIG. 2 is a step diagram illustrating a procedure for manufacturing the torsion bar in FIG. 1.

With reference to FIG. 2, the method of manufacturing the torsion bar 1 is explained. This manufacturing method includes a first shaping step 11 and a second shaping step 12. In this mode, for example, one of spring steels SUP12 of JIS and a high carbon steel wire rods SWRH82B of JIS is selected as a matrix of the torsion bar 1 in which Vickers hardness (HV) is less than 320. A round bar steel material, whose diameter is set to be larger than a finished diameter of the joint portions 3 and 4 if necessary, is prepared as the matrix. Hardness of SUP12 and SWRH82B of JIS is about 200 by Vickers hardness (HV).

At the first shaping step 11, the prepared round bar steel material undergoes cold drawing work, so that its entire diameter in the longitudinal direction is reduced to be uniform.

At the first shaping step 11, reduction of area for the round bar steel material as the matrix is managed, so that predetermined hardness is secured. When the cold drawing work is carried out at a plurality of times, however, the reduction of area at each time and total reduction of area should be set suitably.

The reduction of area γ(%) is represented by a following equation as publicly known.

$$\gamma = \{(A_0 - A_n)/A_0\} \times 100$$

In the above equation, $A_0$ denotes a cross section of the matrix before the work, and $A_n$ denotes a cross section of the matrix after the final work. Incidentally, when SUP12 and SWRH82B of JIS are used, the reduction of area is set to 12 to 15%, so that the hardness of an area of the matrix including an inside through a surface layer is set to 320 or more by Vickers hardness (HV).

At the second shaping step 12, the midway area of the round bar steel material with reduced diameter in the longitudinal direction is cut so as to have a smaller diameter than that of the both end areas in the longitudinal direction, thereby shaping the round bar steel material into the outer shape close to a finished product having the spring portion 2 and the joint portions 3 and 4.

In this case, at the first shaping step 11, the diameter of the round bar steel material with reduced diameter shaped by cold drawing work is set to a dimension slightly larger than a finished diameter of the joint portions 3 and 4. At the second shaping step 12, not only the spring portion 2 but also the joint portions 3 and 4 are cut, so that the diameter of the joint portions 3 and 4 is managed.

The hardness on some places of the matrix in a depthwise direction is inspected after the first shaping step 11 and after the second shaping step 12 in a following manner.

Figure 3:
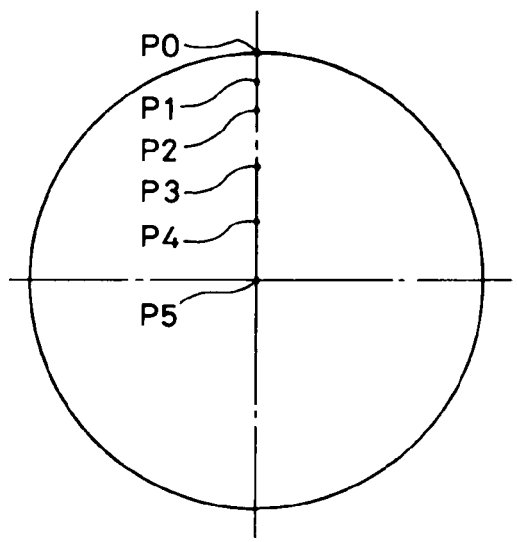
FIG. 3 is a sectional view illustrating a hardness measuring position of a matrix.

The hardness of the joint portions 3 and 4 is measured, and measuring positions are, as shown in FIG. 3, five positions P1 to P5 in the depth wise direction. The position P1 is separated by 0.5 mm from a position P0 (surface), the position P2 is separated by 1.0 mm from the position P0, the position P3 is separated by 2.0 mm from the position P0, the position P4 is separated by 3.0 mm from the position P0, and the position P5 is separated by 4.0 mm from the position P0.

Examples 1 to 4 are prepared as samples. The examples 1 and 2 use SUP12 of JIS as a matrix. The examples 3 and 4 use SWRH82B of JIS as a matrix. Reduction of area in the examples is set to 12.6%.

Figure 4:
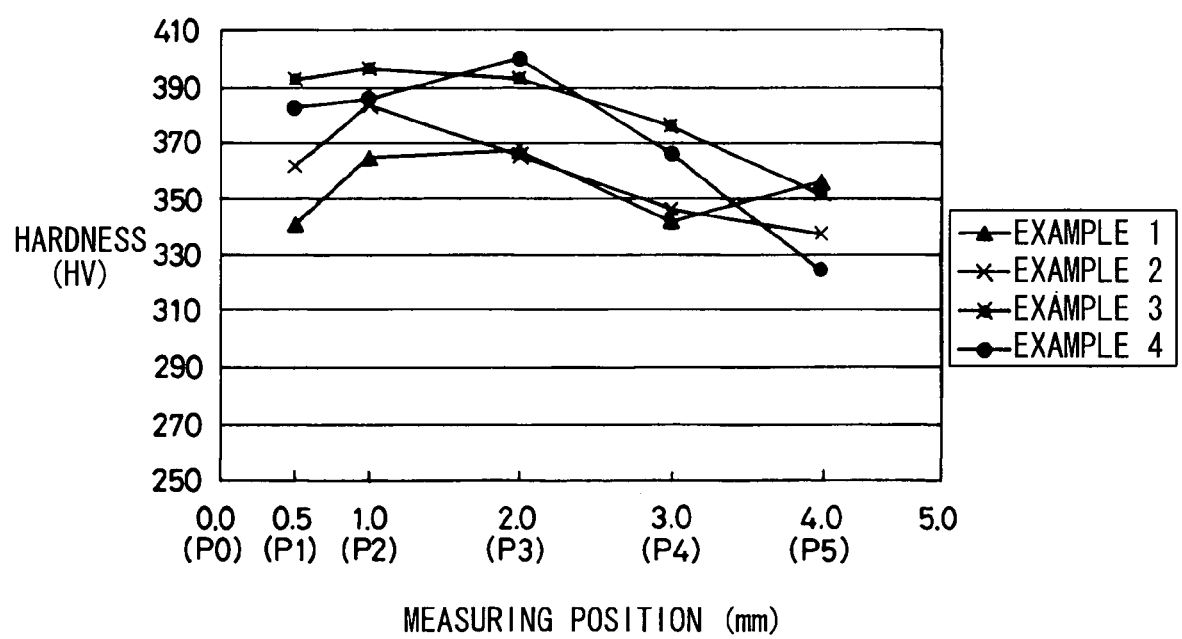
FIG. 4 is a graph showing a result of inspecting the hardness of the matrix after a first shaping step.

The hardness of the examples at the time of completion of the first shaping step 11 is shown in FIG. 4 and Table 1. As mentioned above, places where the hardness is measured are the joint portions 3 and 4, but at the first shaping step 11, since an outer diameter of the entire longitudinal direction of the round bar steel material as the matrix is reduced into an approximately uniform dimension, it is considered that the hardness of the joint portions 3 and 4 is approximately same as the hardness of the spring portion 2.

In the examples 1 to 4, accordingly, the hardness of the entire portion including the inside through the surface of the round bar steel material is 320 or more to 450 or less by Vickers hardness (HV). Preferable Vickers hardness (HV) of the entire round bar steel material is 350 or more to 430 or less.

TABLE 1

| Measuring position from outer diameter Unit (mm) | Example 1 | Example 2 | Example 3 | Example 4 |
|---|---|---|---|---|
| | | Unit (HV) | | |
| P1→0.5 | 340 | 360 | 390 | 380 |
| P2→1.0 | 370 | 380 | 400 | 390 |
| P3→2.0 | 370 | 370 | 390 | 400 |
| P4→3.0 | 340 | 350 | 380 | 370 |
| P5→4.0 | 360 | 340 | 350 | 325 |

Figure 5:
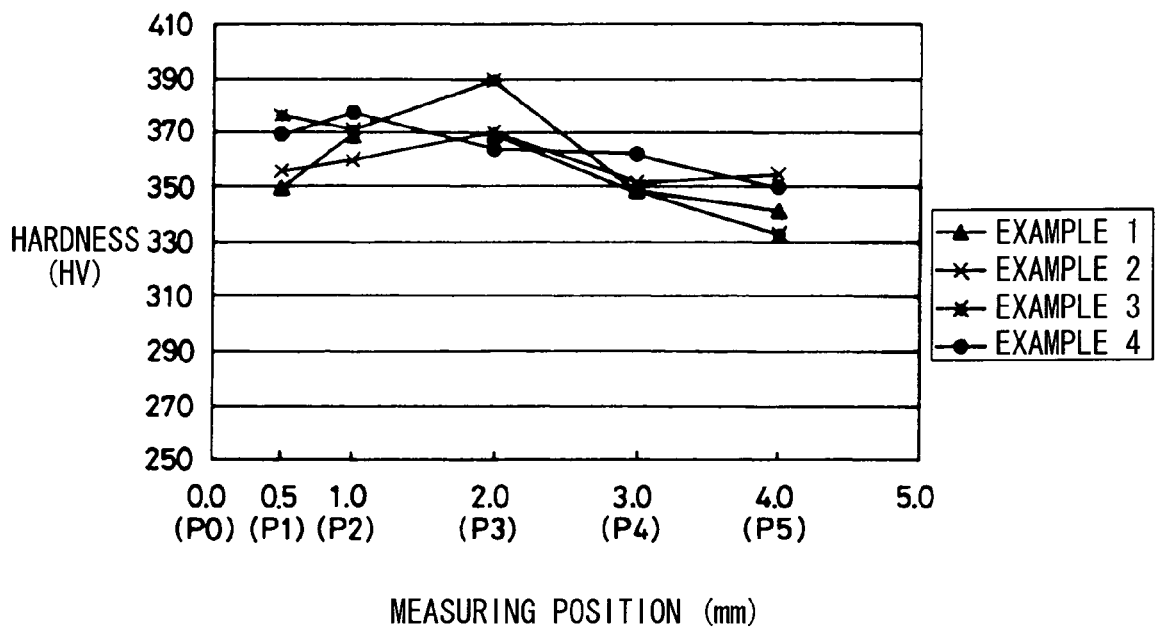
FIG. 5 is a graph showing a result of inspecting the hardness of the matrix after a second shaping step.

The hardness at the time of completion of the second shaping step 12 is shown in FIG. 5 and Table 2.

In the examples 1 to 4, accordingly, the hardness of the round bar steel material including the inside through the surface is 320 or more to 450 or less by Vickers hardness (HV).

TABLE 2

| Measuring position from outer diameter Unit (mm) | Example 1 | Example 2 | Example 3 | Example 4 |
|---|---|---|---|---|
| | | Unit (HV) | | |
| P1→0.5 | 350 | 360 | 380 | 370 |
| P2→1.0 | 370 | 360 | 370 | 380 |
| P3→2.0 | 370 | 370 | 390 | 360 |
| P4→3.0 | 350 | 350 | 350 | 360 |
| P5→4.0 | 340 | 360 | 330 | 350 |

TABLE 3

| Measuring position from outer diameter Unit (mm) | Example 1 | Example 2 | Example 3 | Example 4 |
|---|---|---|---|---|
| | | Unit (HV) | | |
| P1→0.5 | 370 | 390 | 390 | 390 |
| P2→1.0 | 380 | 390 | 390 | 390 |
| P3→2.0 | 380 | 390 | 390 | 390 |
| P4→3.0 | 360 | 370 | 370 | 380 |
| P5→4.0 | 370 | 370 | 360 | 360 |

In the case where the SUP12 and SWRH82B of JIS are used as the matrix, the reduction of area at the first shaping step 11 is set to 12 to 15%, preferably to 12.6%, so that the hardness of the spring portion 2 and the joint portions 3 and 4 are set to 320 or more by Vickers hardness (HV).

When the above-mentioned hardness is secured, tensile strength of the torsion bar 1 is set to 100 to 165 kg/mm$^2$, and fatigue limit under rotary bending is set to 48 to 70 kg/mm$^2$. Fatigue strength against repeated torsion can satisfy a condition such that when a torsion stress of 300 MPa or more is applied, the repeated torsion can be carried out at least $5 \times 10^6$ times similarly to the prior matrices. Incidentally, when the above fatigue strength against repeated torsion is secured, the torsion bar 1 fulfills the function in the steering apparatus such as a power steering mounted to a vehicle such as an automobile.

In the case of the torsion bar 1 of the above-mentioned mode, the matrix of the torsion bar 1 is selected and is plastically deformed without undergoing heat curing treatment. As a result, cost of the matrix may rise higher than the prior matrices, but since the heat curing treatment is not carried out, production efficiency can be improved and manufacturing cost can be reduced. In the manufacturing method of the present invention, therefore, the torsion bar 1 with high quality which satisfies a predetermined performance can be manufactured at a comparatively low price.

The present invention is not limited only to the above mode, and various applications and modifications are considered.

Figure 6:
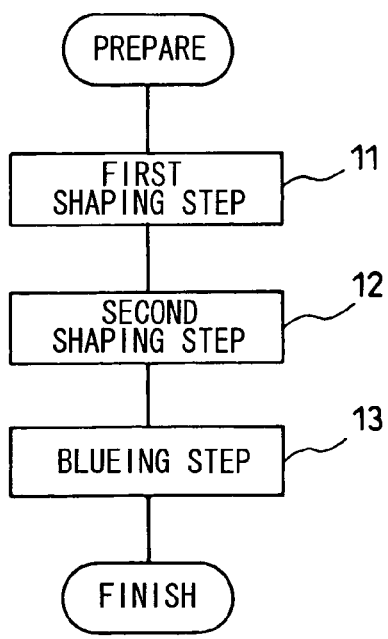
FIG. 6 is a step diagram illustrating a procedure for manufacturing the torsion bar according to another mode of the present invention.

(1) In the above mode, after the second shaping step 12, blueing work which is a well known technique may be executed. That is to say, as shown in FIG. 6, the first shaping step 11, the second shaping step 12 and the blueing step 13 may be executed in this order as the manufacturing steps of the torsion bar 1.

The first and second shaping steps 11 and 12 are the same as those in the aforementioned mode, the explanation thereof is omitted. At the blueing step 13, the matrix is heated at ambient temperature of 200 to 350° C., for example. In this case, since it is an object of the blueing step to remove a residual stress in cold-formed products, the treatment temperature is 200 to 350° C. as mentioned above, namely, comparatively low. For this reason, this step is different from the high-temperature heat treatment for heightening hardness of a prior torsion bar shaped into a finished product.

Figure 7:
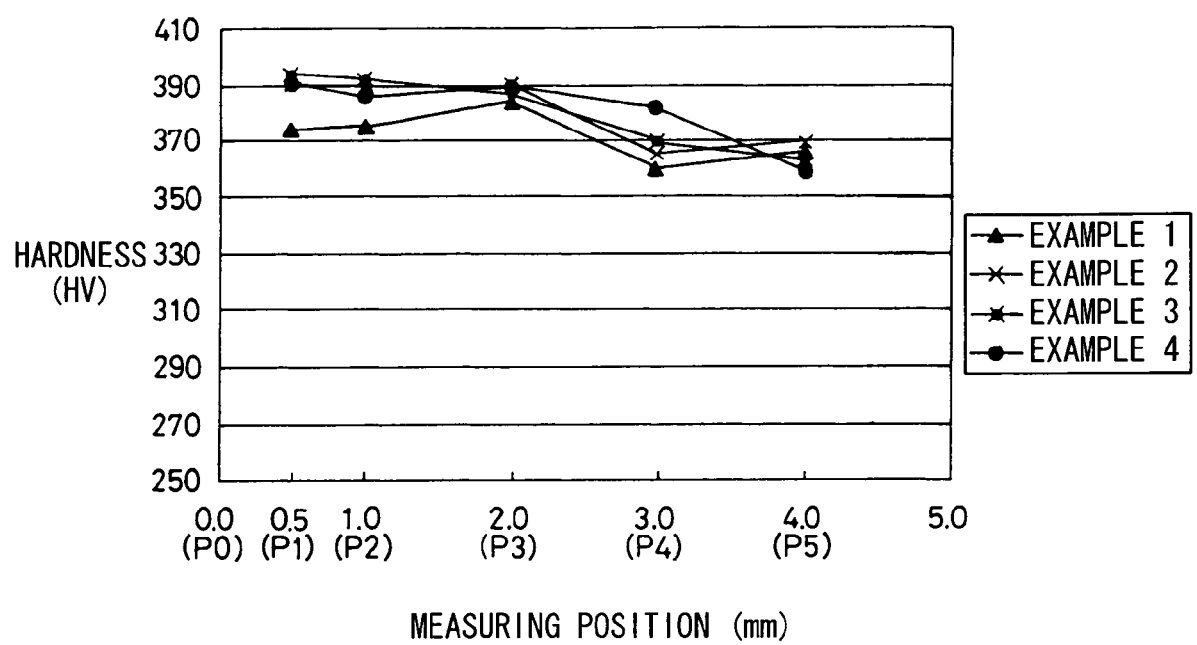
FIG. 7 is a graph showing a result of inspecting the hardness of the matrix after the blueing step.

In this mode, at the time of completion of the blueing step 13, as shown in FIG. 7 and following Table 3, the hardness of the spring portion 2 and the joint portion 3 and 4 can be heightened to 360 or more by bickers hardness (HV).

(2) In the mode explained in (1), the blueing step 13 may be executed before the second shaping step 12.

(3) In the above modes, after the final step, the round bar steel material which is shaped into the outer shape close to the finished product is cut, so that quality such as accuracy of an outside dimension can be further improved. In the manufacturing method explained in (1), the cutting may be carried out between the second shaping step 12 and the blueing step 13. Since the cutting is not for removing warpage and distortion due to the heat curing process unlike the prior example, it only takes a short time.

As is clear from the above modes, in the manufacturing method of the present invention, the steel material, which has a shape close to the finished product of the torsion bar, does not undergo the heat treatment for heightening the hardness which causes high cost unlike the prior example. In the manufacturing method of the present invention, therefore, the production efficiency can be improved and the manufacturing cost can be reduced. In the manufacturing method of the present invention, therefore, the torsion bar which satisfies the predetermined performance can be manufactured at comparatively low cost.

INDUSTRIAL APPLICABILITY

The present invention can be applied to the torsion bar to be used in the steering apparatus such as a power steering mounted to a vehicle such as an automobile.

The invention claimed is:

1. A method of manufacturing a torsion bar having a spring portion in a midway area in a longitudinal direction and joint portions on both ends in the longitudinal direction, comprising:
   a first shaping step of reducing a diameter of a steel object by reduction of cross-sectional area of said steel object by an amount within a predetermined range by cold drawing so as to heighten a hardness of said steel object within a predetermined range, said steel object being cold drawn in its entire longitudinal length to reduce the diameter thereof along said entire longitudinal length of said steel object to thereby heighten the hardness of said entire longitudinal length of said steel object; and
   a second shaping step of cutting the midway area of the steel object in the longitudinal direction so as to obtain the spring portion.

2. The method of manufacturing the torsion bar according to claim 1, wherein in the first shaping step, the diameter of the shaped steel object is reduced by the cold drawing so as to be slightly larger than a finished diameter of the joint portions, and at the second shaping step, the spring portion and the joint portions are cut so that the finished diameter of the joint portions is attained.

3. The method of manufacturing the torsion bar according to claim 1, further comprising performing blueing work on the steel object before or after the second shaping step.

4. The method of manufacturing a torsion bar according to claim 1, wherein said steel object is configured in a solid shape which is not hollow in the longitudinal direction.

5. The method of manufacturing a torsion bar according to claim 1, wherein said steel object has a uniform diameter along said entire longitudinal length thereof after said first shaping step.

6. An apparatus comprising:
the torsion bar manufactured by the manufacturing method according to claim 1;
a steering wheel; and
a steering gear box, wherein
said torsion bar is a torsion bar for transmitting a rotating power of said steering wheel to said steering gear box.

7. A method of manufacturing a torsion bar having a spring portion in a midway area in a longitudinal direction and joint portions on both ends in the longitudinal direction, comprising:
a first shaping step of reducing a diameter of a steel material by reduction of cross sectional area by an amount within a predetermined range according to cold drawing work so as to heighten a hardness of an entire steel material within a predetermined range; and
a second shaping step of cutting the midway area of the steel material in the longitudinal direction so as to obtain the spring portion, wherein the Vickers hardness (NV) of the entire steel material after the cold drawing work is 320 to 450.

8. A method of manufacturing a torsion bar having a spring portion in a midway area in a longitudinal direction and joint portions on both ends in the longitudinal direction, comprising:
a first shaping step of reducing a diameter of a steel material by reduction of cross sectional area by an amount within a predetermined range according to cold drawing work so as to heighten a hardness of an entire steel material within a predetermined range; and
a second shaping step of cutting the midway area of the steel material in the longitudinal direction so as to obtain the spring portion, wherein the reduction of cross sectional area is 12 to 15%.

9. A method of manufacturing a torsion bar having a spring portion in a midway area in a longitudinal direction and joint portions on both ends in the longitudinal direction, comprising:
a first shaping step of reducing a diameter of a steel material by reduction of cross sectional area by an amount within a predetermined range according to cold drawing work so as to heighten a hardness of an entire steel material within a predetermined range; and
a second shaping step of cutting the midway area of the steel material in the longitudinal direction so as to obtain the spring portion, wherein at the first shaping step, the cold drawing work is carried out a plurality of times, and in an equation $\gamma=\{(A0-A1) / A0\}\times 100$ in which the reduction of cross sectional area of die steel material at each time is $\gamma(\%)$, a cross section of the steel material before the drawing work is A0, and a cross section of the steel material after final work of the drawing work is A1, the reduction of cross sectional area is Set to 12 to 15%, and the Vickers hardness (HV) is set to 320 or more.

10. A torsion bar having a spring portion in a midway area in a longitudinal direction and joint portions on both ends in the longitudinal direction, said torsion bar being manufactured by a first shaping step of reducing a diameter of a steel object by reduction of cross sectional area of said steel object by an amount within a predetermined range by cold drawing so as to heighten a hardness of said steel object within a predetermined range, said steel object being cold drawn in its entire longitudinal length to reduce the diameter thereof along said entire longitudinal length of said steel object to thereby heighten the hardness of said entire longitudinal length of said steel object, and a second shaping step of cutting the midway area of the steel object material in the longitudinal direction so as to obtain the spring portion.

11. The torsion bar according to claim 10, wherein Vickers hardness (HV) measurements of said steel object along said entire longitudinal length thereof after the cold drawing are in the range of 320 to 450.

12. The torsion bar according to claim 10, wherein said steel object is configured in a solid shape which is not hollow in the longitudinal direction.

13. The torsion bar according to claim 10, wherein said steel object has a uniform diameter along said entire longitudinal length thereof after said first shaping step.

14. An apparatus comprising:
the torsion bar according to claim 10;
a steering wheel; and
a steering gear box, wherein
said torsion bar is a torsion bar for transmitting a rotating power of said steering wheel to said steering gear box.

15. A torsion bar having a spring portion in a midway area in a longitudinal direction and joint portions on both ends in the longitudinal direction, said torsion bar being manufactured by a first a shaping step of reducing a diameter of a steel material by reduction of cross sectional area by an amount within a predetermined range according to cold drawing work so as to heighten a hardness of an entire steel material within a predetermined range and the second shaping step of cutting the midway area of the steel material in the longitudinal direction so as to obtain the spring portion, wherein the reduction of cross sectional area is 12 to 15%.

* * * * *